(12) United States Patent
Shimauchi et al.

(10) Patent No.: US 11,879,517 B2
(45) Date of Patent: Jan. 23, 2024

(54) SHOCK ABSORBER

(71) Applicant: KYB CORPORATION, Tokyo (JP)

(72) Inventors: Sodai Shimauchi, Gifu (JP); Koichiro Awano, Tokyo (JP); Masashi Uemura, Tokyo (JP)

(73) Assignee: KYB CORPORATION, Tokyo (JP)

(*) Notice: Subject to any disclaimer, the term of this patent is extended or adjusted under 35 U.S.C. 154(b) by 128 days.

(21) Appl. No.: 17/434,960

(22) PCT Filed: Feb. 28, 2020

(86) PCT No.: PCT/JP2020/008379
§ 371 (c)(1),
(2) Date: Aug. 30, 2021

(87) PCT Pub. No.: WO2020/179683
PCT Pub. Date: Sep. 10, 2020

(65) Prior Publication Data
US 2022/0136580 A1  May 5, 2022

(30) Foreign Application Priority Data

Mar. 4, 2019  (JP) .................................. 2019-038131

(51) Int. Cl.
*F16F 9/46* (2006.01)
*F16F 9/10* (2006.01)
(Continued)

(52) U.S. Cl.
CPC ............ *F16F 9/103* (2013.01); *F16F 9/3214* (2013.01); *F16F 9/3235* (2013.01); *F16F 9/34* (2013.01); *F16F 9/446* (2013.01); *F16K 3/26* (2013.01)

(58) Field of Classification Search
CPC ........ F16F 9/103; F16F 9/3214; F16F 9/3235; F16F 9/34; F16F 9/46; F16F 9/446; F16F 9/48; F16F 9/50; B60G 17/08
(Continued)

(56) References Cited

U.S. PATENT DOCUMENTS 5,080,392 A * 1/1992 Bazergui ................... F16F 9/06
280/124.159
6,079,526 A * 6/2000 Nezu ......................... F16F 9/46
188/266.6
(Continued)

FOREIGN PATENT DOCUMENTS

DE  19654300 C2  7/1997
DE  602004003754 T2  10/2007
(Continued)

OTHER PUBLICATIONS

Aug. 16, 2023, German Office Action issued for related DE Application No. 11 2020 001 098.8.

*Primary Examiner* — Christopher P Schwartz
(74) *Attorney, Agent, or Firm* — Paratus Law Group, PLLC

(57) ABSTRACT

A shock absorber includes a hard side damping element that imparts a resistance to a flow of liquid moving between an extension side chamber and a compression side chamber, a solenoid valve configured to change an aperture area of a bypass passage that bypasses the hard side damping element and communicates with the extension side chamber and the compression side chamber, a soft side damping element provided in series with the solenoid valve in the bypass passage, and a tank connected to the compression side chamber. The hard side damping element includes an orifice and leaf valves provided in parallel with the orifice. The soft (Continued)

side damping element includes an orifice having a larger aperture area than the orifice.

8 Claims, 7 Drawing Sheets

(51) Int. Cl.
*F16F 9/32* (2006.01)
*F16F 9/34* (2006.01)
*F16F 9/44* (2006.01)
*F16K 3/26* (2006.01)

(58) Field of Classification Search
USPC ...... 188/281, 282.1, 282.7, 282.8, 314, 317, 188/318, 322.13, 322.21
See application file for complete search history.

(56) References Cited

U.S. PATENT DOCUMENTS

| | | | |
|---|---|---|---|
| 8,393,448 B2* | 3/2013 | Kunstle | F16F 9/467 |
| | | | 188/300 |
| 8,833,532 B2* | 9/2014 | Yamashita | F16F 9/50 |
| | | | 188/322.15 |
| 9,827,822 B2* | 11/2017 | Tanahashi | F16F 9/3235 |
| 10,495,177 B2* | 12/2019 | Kamakura | F16F 9/50 |
| 10,844,926 B2* | 11/2020 | Tsuji | F16F 9/3214 |
| 2006/0124414 A1* | 6/2006 | Hanawa | B62K 25/08 |
| | | | 188/314 |
| 2016/0061283 A1* | 3/2016 | Yamashita | F16F 9/3484 |
| | | | 188/313 |
| 2018/0080518 A1 | 3/2018 | Tsuji | |
| 2018/0135718 A1* | 5/2018 | Kobayashi | F16F 9/32 |
| 2022/0128117 A1* | 4/2022 | Awano | F16F 9/34 |
| 2023/0108079 A1* | 4/2023 | Hayashiguchi | F16F 9/466 |
| | | | 188/281 |
| 2023/0109503 A1* | 4/2023 | Awano | F16F 13/007 |
| | | | 188/282.1 |

FOREIGN PATENT DOCUMENTS

| | | | | |
|---|---|---|---|---|
| EP | 1505315 A2 | | 2/2005 | |
| JP | 2010-007758 A | | 1/2010 | |
| JP | 2013053681 A | * | 3/2013 | ............... F16F 9/50 |
| JP | 2014-156885 A | | 8/2014 | |
| JP | 2015-102100 A | | 6/2015 | |
| JP | 2017-002983 A | | 1/2017 | |
| JP | 2018-004023 A | | 1/2018 | |
| JP | 2018004023 A | * | 1/2018 | ............... F16F 9/46 |

* cited by examiner

SHOCK ABSORBER

CROSS REFERENCE TO PRIOR APPLICATION

This application is a National Stage Patent Application of PCT International Patent Application No. PCT/JP2020/008379 (filed on Feb. 28, 2020) under 35 U.S.C. § 371, which claims priority to Japanese Patent Application No. 2019-038131 (filed on Mar. 4, 2019), which are all hereby incorporated by reference in their entirety.

TECHNICAL FIELD

The present invention relates to an improvement of a shock absorber.

BACKGROUND ART

In some shock absorbers of the related art, a liquid such as hydraulic oil is contained inside a cylinder, a resistance is imparted by a damping element to a liquid flow produced when a piston moves inside the cylinder, and a damping force caused by the resistance is exhibited.

The damping element is configured to include an orifice and a leaf valve provided in parallel with the orifice, for example. Additionally, in the case where the piston speed is in a low-speed range and the differential pressure between the upstream side and the downstream side of the damping element does not satisfy the valve-opening pressure of the leaf valve, the liquid passes through the orifice only. On the other hand, in the case where the piston speed is in a medium- to high-speed range and the above differential pressure is equal to or greater than the valve-opening pressure of the leaf valve, the liquid passes through the leaf valve.

Consequently, at the point when the leaf valve opens, the characteristics of the damping force (hereinafter referred to as the "damping force characteristics") with respect to the piston speed in the above shock absorber change from orifice characteristics, which are proportional to the square of the piston speed and specific to orifices, to valve characteristics, which are proportional to the piston speed and specific to leaf valves.

Additionally, in some shock absorbers, to adjust the damping force that is produced, a bypass passage that bypasses the damping element and a needle valve that adjusts the magnitude of the aperture area of the bypass passage may be provided, or a pilot valve that controls the back pressure of the leaf valve forming the damping element may be provided (for example, see Patent Literature 1 and 2).

CITATION LIST

Patent Literature

Patent Literature 1: JP 2010-7758 A
Patent Literature 2: JP 2014-156885 A

SUMMARY OF INVENTION

Technical Problem

For example, with the shock absorber provided with the needle valve described in JP 2010-7758 A, if the needle valve is driven to increase the aperture area of the bypass passage, the flow of liquid passing through the damping element decreases, and the produced damping force becomes smaller (soft mode in FIG. 6). Conversely, if the aperture area of the bypass passage is decreased, the flow of liquid passing through the damping element increases, and the produced damping force becomes larger (hard mode in FIG. 6).

Such adjustment of the damping force with a needle valve is mainly used to adjust the magnitude of the damping force in the case where the piston speed is in a low-speed range. Additionally, when using the above needle valve to adjust the aperture area of the bypass passage, the magnitude of the damping force is also adjusted somewhat in the case where the piston speed is in a medium- to high-speed range, but it is difficult to widen the adjustment range.

On the other hand, with the shock absorber provided with the pilot valve described in JP 2014-156885 A, if the valve-opening pressure of the pilot valve is lowered to reduce the back pressure on the leaf valve, the valve-opening pressure of the leaf valve is decreased, and the produced damping force becomes smaller (soft mode in FIG. 7). Conversely, if the valve-opening pressure of the pilot valve is raised to increase the back pressure on the leaf valve, the valve-opening pressure of the leaf valve is increased, and the produced damping force becomes larger (hard mode in FIG. 7).

In this way, in the case of controlling the back pressure on the leaf valve to change the valve-opening pressure thereof, the adjustment range of the damping force can be widened in the case where the piston speed is in a medium- to high-speed range. However, in this case, the characteristic line indicating the damping force characteristics in the medium- to high-speed range is shifted vertically without changing slope, and consequently, the slope of the characteristic line changes suddenly during the transition from the low-speed range to the medium- to high-speed range, particularly in hard mode. For this reason, there is a possibility that installing the shock absorber in a vehicle may cause a rider to feel uncomfortable and lead to degraded ride quality.

Accordingly, an object of the present invention is to address these problems and provide a shock absorber capable of widening the adjustment range of the damping force in the case where the piston speed is in the medium- to high-speed range, and also improve the ride quality in the case of installing the shock absorber in a vehicle.

Solution to Problem

A shock absorber that addresses the above problems is provided with a hard side damping element that imparts a resistance to the flow of a liquid moving between an extension side chamber and a compression side chamber divided by a piston movably inserted into a cylinder, a solenoid valve configured to change the aperture area of a bypass passage that bypasses the hard side damping element and communicates with the extension side chamber and the compression side chamber, a soft side damping element provided in series with the bypass passage and the solenoid valve, and a tank, connected to the compression side chamber, that pressurizes an interior of the cylinder. Additionally, the hard side damping element is configured to include an orifice and a leaf valve provided in parallel with the orifice, and the soft side damping element is configured to include a large-diameter orifice having a greater aperture area than the orifice.

According to the above configuration, the characteristics of the damping force produced by the shock absorber take on orifice characteristics specific to orifices in the case where the piston speed is in a low-speed range, and take on valve characteristics specific to leaf valves in the case where the piston speed is in a medium- to high-speed range. Additionally, if the aperture area of the bypass passage is changed by the solenoid valve, the distribution ratio of the flow of the liquid moving between the extension side chamber and the compression side chamber that passes through each of the hard side damping element and the soft side damping element changes, and therefore both the damping coefficient in the case where the piston speed is in a low-speed range and the damping coefficient in the case of the medium- to high-speed range can be set freely, and the adjustment range of the produced damping force can be widened.

Furthermore, in the soft mode that increases the distribution ratio of the liquid passing through the soft side damping element, both the damping coefficient in the case where the piston speed is in the low-speed range and the damping coefficient in the case of the medium- to high-speed range can be reduced. Conversely, in the hard mode that decreases the distribution ratio of the liquid passing through the soft side damping element, both the damping coefficient in the case where the piston speed is in the low-speed range and the damping coefficient in the case of the medium- to high-speed range can be increased. With this configuration, when the damping force characteristics changes from the orifice characteristics in the low-speed range to the valve characteristics in the medium- to high-speed range, a more gradual slope of the characteristic line can be achieved in both modes, and therefore in the case of installing the shock absorber according to the present invention in a vehicle, a favorable ride quality of the vehicle can be achieved.

In addition, the above shock absorber, the soft side damping element may include a leaf valve provided in parallel with the large-diameter orifice. With this configuration, even if highly rigid valves are adopted as the leaf valves of the hard side damping element, the damping force in soft mode does not become excessive. Consequently, the adjustment range of the damping force in the case where the piston speed is in the medium- to high-speed range can be widened further.

Also, in the above shock absorber, the solenoid valve may also be set such that the opening degree varies proportionally with the energization level. With this configuration, the aperture area of the bypass passage can be adjusted continuously.

In addition, in the above shock absorber, the solenoid valve may include a tubular holder in which a port that connects to the bypass passage is formed, a spool inserted into the holder to allow reciprocating motion and configured to open and close the port, a biasing spring that biases the spool in one movement direction of the spool, and a solenoid that imparts thrust to the spool in a direction opposing a biasing force of the biasing spring. With this configuration, the opening degree of the solenoid valve can be increased easily without increasing the stroke length of the spool that acts as the valve element of the solenoid valve, and therefore the adjustment range of the aperture area of the bypass passage can be widened easily. Furthermore, a higher degree of freedom to set the relationship between the opening degree and the energization level of the solenoid valve can be achieved.

In addition, in the above shock absorber, an extension side hard valve that imparts a resistance to the flow of the liquid proceeding from the extension side chamber to the compression side chamber and a compression side hard leaf valve that imparts a resistance to the flow of the liquid proceeding from the compression side chamber to the extension side chamber may be provided as the leaf valve of the hard side damping element, and an extension side soft leaf valve that imparts a resistance to the flow of the liquid proceeding from the extension side chamber to the compression side chamber through the bypass passage and a compression side soft leaf valve that imparts a resistance to the flow of the liquid proceeding from the compression side chamber to the extension side chamber through the bypass passage may be provided as the leaf valve of the soft side damping element. With this configuration, the adjustment range of the damping force on both the extension and compression sides in the case where the piston speed is in the medium- to high-speed range can be widened.

In addition, in the above shock absorber, an extension side hard leaf valve that imparts a resistance to the flow of the liquid proceeding from the extension side chamber to the compression side chamber and a compression side hard leaf valve that imparts a resistance to the flow of the liquid proceeding from the compression side chamber to the extension side chamber may be provided as the leaf valve of the hard side damping element, and only an extension side soft leaf valve that imparts a resistance to the flow of the liquid proceeding from the extension side chamber to the compression side chamber through the bypass passage may be provided as the leaf valve of the soft side damping element. In the case of such a configuration, the adjustment range of the extension side damping force can be increased, particularly in the case where the piston speed is in the medium- to high-speed range.

In addition, in the above shock absorber, the spool may move along a line orthogonal to a central axis passing through a center of the piston rod. With this configuration, in the case of installing the shock absorber in a vehicle, it is possible to prevent the spool from oscillating in the movement direction due to vibrations while the vehicle is in motion.

In addition, the above-described shock absorber may include a housing that internally houses the solenoid valve and the soft side damping element, in which the housing is united with the cylinder. With this configuration, the housing and the cylinder do not have to be connected by a hose, and therefore an unintentional production of damping force due to the resistance when liquid passes through the hose can be prevented. Furthermore, it is possible to lower costs by omitting the hose.

Advantageous Effects of Invention

According to the shock absorber according to the present invention, it is possible to widen the adjustment range of the damping force in the case where the piston speed is in the medium- to high-speed range, and also improve the ride quality in the case of installing the shock absorber in a vehicle.

DESCRIPTION OF EMBODIMENTS

Figure 1:
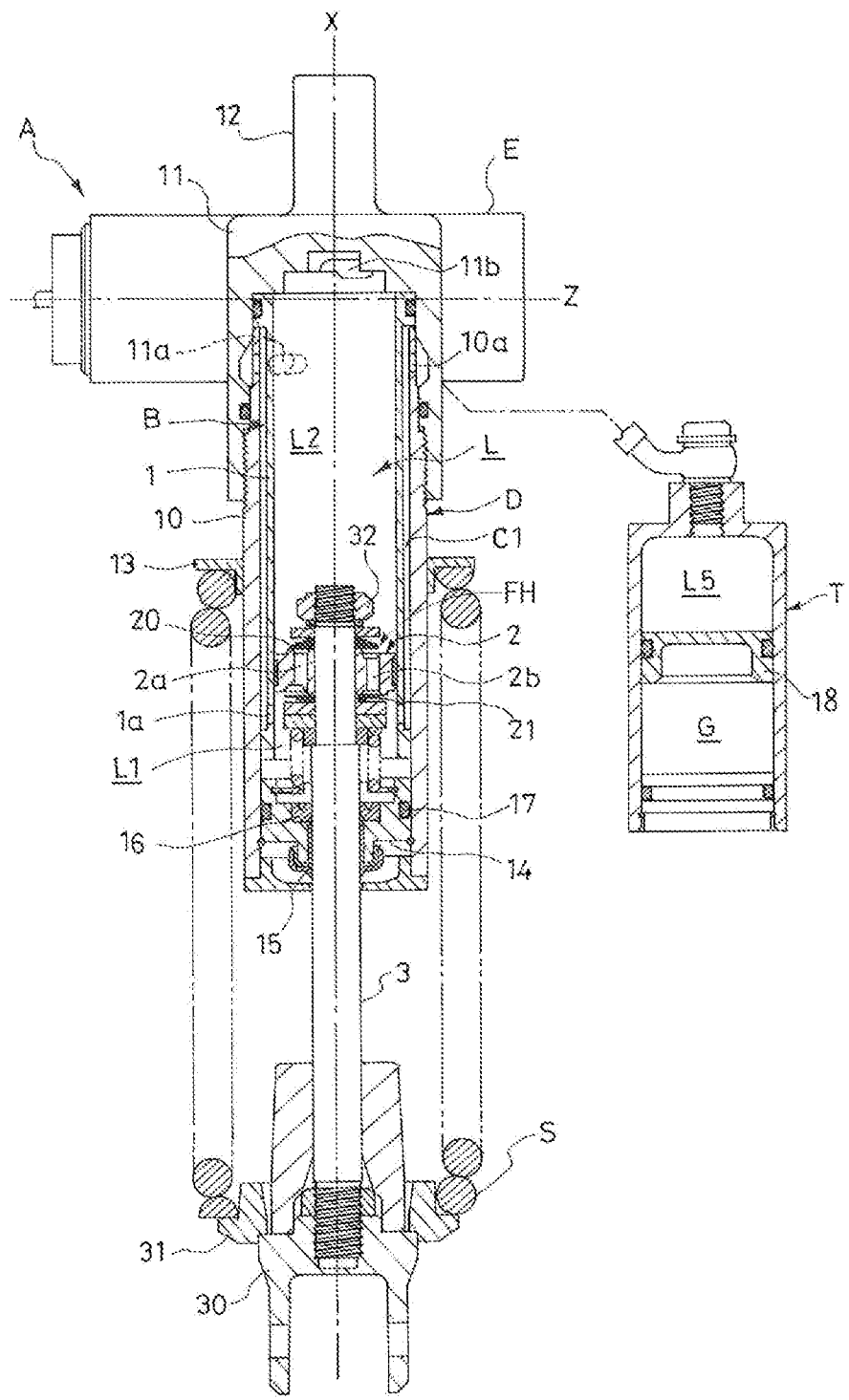
FIG. 1 is a partial cutaway front view of a shock absorber according to an embodiment of the present invention.

Hereinafter, a shock absorber according to an embodiment of the present invention will be described with reference to the drawings. The same reference numerals denoted throughout several drawings refer to the same components or corresponding components. Also, the shock absorber according to an embodiment of the present invention is used in a rear cushion device that suspends the rear wheel of a saddle-type vehicle. In the following description, upper and lower directions in a state where the shock absorber is installed in a vehicle are simply referred to as "upper" or "up" and "lower" or "down", respectively, or referred to as "vertically", unless otherwise specified.

As illustrated in FIG. 1, a shock absorber A according to an embodiment of the present invention is provided with a shock absorber main body D that can be extended and contracted including an outer shell 10 and a piston rod 3 that enters and exits the outer shell 10, a suspension spring S provided on the perimeter of the shock absorber main body D, a damping force adjustment unit E integrated with the shock absorber main body D, and a tank T connected to the damping force adjustment unit E by a hose.

Furthermore, the shock absorber A is of the inverted type, and the piston rod 3 projects downward from the outer shell 10. On the lower end of the piston rod 3, an axle side bracket 30 is provided. The bracket 30 is joined to a swing arm that is swingably joined to the vehicle body. A rear wheel is supported by the swing arm so as to rotate freely, and therefore the piston rod 3 may be considered to be joined to the axle of the rear wheel.

On the other hand, a closed-top cylindrical end cap 11 is screwed onto the upper perimeter of the outer shell 10. A vehicle body side bracket 12 is provided on top of the end cap 11, and the outer shell 10 is joined to the vehicle body through the bracket 12.

The shock absorber main body D configured in this way is installed between the vehicle body and the rear wheel axle of a vehicle. Additionally, if the vehicle runs on an uneven road surface or the like and the rear wheel shakes vertically with respect to the vehicle body, the piston rod 3 enters and exits the outer shell 10, and the shock absorber main body D extends and contracts. In this way, the extension and contraction of the shock absorber main body D is also referred to as the extension and contraction of the shock absorber A.

Also, in the present embodiment, the suspension spring S is a coil spring. The top end of the suspension spring S is supported by an upper spring seat 13 mounted on the perimeter of the outer shell 10. On the other hand, the bottom end of the suspension spring S is supported by a lower spring seat 31 attached to an axle side bracket 30. Because the axle side bracket 30 is joined to the piston rod 3, one end of the suspension spring S is supported by the outer shell 10 while the other end can be said to be supported by the piston rod 3.

Additionally, when the shock absorber A contracts and the piston rod 3 enters the outer shell 10, the suspension spring S is compressed and exhibits an elastic force that biases the shock absorber A in the extension direction. In this way, the suspension spring S exhibits an elastic force according to the compression amount, and elastically supports the vehicle body.

Note that the mounting direction of the shock absorber A is not limited to the illustration in the drawing, and the shock absorber A may also be mounted upside down relative to FIG. 1, for example. Also, the object in which the shock absorber A is installed is not limited to a vehicle, and may be changed appropriately. Furthermore, the suspension spring S obviously may be a spring other than a coil spring, such as an air spring, and the suspension spring S may also be omitted depending on the object in which the shock absorber A is installed.

Next, the shock absorber main body D is a multi-cylinder type, and is provided with a cylinder 1 as an inner cylinder on the inner side of the outer shell 10. A piston 2 is slidably inserted into the cylinder 1. The piston 2 is joined to the upper perimeter of the piston rod 3 by a nut 32. Additionally, when the shock absorber A extends or contracts, the piston rod 3 enters and exits the cylinder 1, and the piston 2 moves up and down (in the axial direction) inside the cylinder 1.

Also, as described above, the closed-top cylindrical end cap 11 is screwed onto the upper perimeter of the outer shell 10, and the top end of the outer shell 10 is closed by the end cap 11. On the other hand, an annular rod guide 14 that slidably supports the piston rod 3 is mounted on the bottom end of the outer shell 10. Seals 15, 16, and 17 are fitted onto the rod guide 14, such that the outer perimeter of the piston rod 3 and the inner perimeter of the outer shell 10 are each sealed.

With this configuration, a closed space is formed inside the outer shell 10, and liquid contained inside the outer shell 10, including inside the cylinder 1, is prevented from leaking out. Additionally, a hydraulic chamber L filled with a liquid such as hydraulic oil is formed inside the cylinder 1, and the hydraulic chamber L is divided into a lower extension side chamber L1 and an upper compression side chamber L2 by the piston 2.

The extension side chamber L1 referred to herein is the chamber of the two chambers divided by the piston 2 that is compressed by the piston 2 when the shock absorber A extends. On the other hand, the compression side chamber L2 is the chamber of the two chambers divided by the piston 2 that is compressed by the piston 2 when the shock absorber A contracts.

Figure 3:
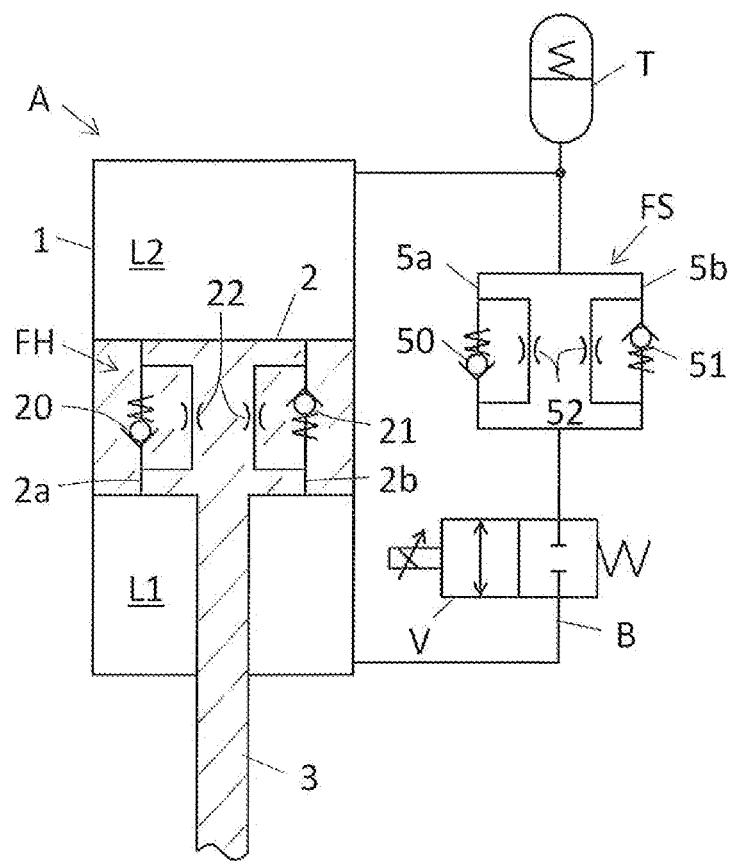
FIG. 3 is a hydraulic circuit diagram of a shock absorber according to an embodiment of the invention.

An extension side passage 2a and a compression side passage 2b that communicate with the extension side chamber L1 and the compression side chamber L2 are formed in the piston 2, while in addition, a hard side damping element FH that imparts a resistance to the flow of liquid that passes through the extension side passage 2a or the compression side passage 2b to move between the extension side chamber L1 and the compression side chamber L2 is attached to the piston 2. The hard side damping element FH is configured to include an extension side hard leaf valve 20 acting as a leaf valve that opens and closes the extension side passage 2a, a compression side hard leaf valve 21 acting as a leaf valve that opens and closes the compression side passage 2b, and an orifice 22 (FIG. 3).

Each of the extension side and compression side hard leaf valve 20 is a thin annular plate formed using a metal or the like, or a laminated body formed by stacking such annular plates, and is elastic. The extension side hard leaf valve 20 is mounted on the upper side of the piston 2 in a state allowing outward circumferential flexion, and the pressure of the extension side chamber L1 acts on the extension side hard leaf valve 20 in a direction causing the peripheral part to flex upward. The compression side hard leaf valve 21 is stacked on the lower side of the piston 2 in a state allowing outward circumferential flexion, and the pressure of the compression side chamber L2 acts on the compression side hard leaf valve 21 in a direction causing the peripheral part to flex downward.

The orifice 22 is formed by a notch provided in a peripheral part of one or both of the extension side and compression side hard leaf valves 20 and 21 that leave and land on a valve seat of the piston 2, or by a stamp or the like provided in the seat. Consequently, the orifice 22 may be considered to be provided in parallel with the extension side and compression side hard leaf valves 20 and 21 in one or both of the extension side passage 2a and the compression side passage 2b.

When the shock absorber A extends, the piston 2 is compressed and the internal pressure inside the extension side chamber L1 rises higher than the pressure in the compression side chamber L2. On the other hand, when the shock absorber A contracts, the piston 2 is compressed and the internal pressure inside the compression side chamber L2 rises higher than the pressure in the extension side chamber L1. In this way, a differential pressure occurs between the extension side chamber L1 and the compression side chamber L2 when the shock absorber A extends or contracts. Additionally, in the case where the piston speed is in a low-speed range when the shock absorber A extends or contracts, and the differential pressure does not satisfy the valve-opening pressure of the extension side and compression side hard leaf valves 20 and 21, liquid passes through the orifice 22 and proceeds from the extension side chamber L1 to the compression side chamber L2 during extension or from the compression side chamber L2 to the extension side chamber L1 during contraction. Then, the resistance is given to the flow of the liquid by the orifice 22.

Also, if the piston speed rises to a medium- to high-speed range when the shock absorber A extends, and the differential pressure increases to meet or exceed the valve-opening pressure of the extension side hard leaf valve 20, the peripheral part of the extension side hard leaf valve 20 flexes upward, a gap is formed between the peripheral part and the piston 2, and liquid passes through the gap and proceeds from the extension side chamber L1 to the compression side chamber L2 while a resistance is also imparted to the flow of the liquid.

Also, if the piston speed increases to be in the medium- to high-speed range when the shock absorber A contracts, and the differential pressure increases to meet or exceed the valve-opening pressure of the compression side hard leaf valve 21, the peripheral part of the compression side hard leaf valve 21 flexes downward, a gap is formed between the peripheral part and the piston 2, and liquid passes through the gap and proceeds from the compression side chamber L2 to the extension side chamber L1 while a resistance is also imparted to the flow of the liquid.

As the above demonstrates, the orifice 22 of the hard side damping element FH and the extension side hard leaf valve 20 function as an extension side first damping element that imparts a resistance to the flow of liquid proceeding from the extension side chamber L1 to the compression side chamber L2 when the shock absorber A extends. Additionally, the orifice 22 of the hard side damping element FH and the compression side hard leaf valve 21 function as a compression side first damping element that imparts a resistance to the flow of liquid proceeding from the compression side chamber L2 to the extension side chamber L1 when the shock absorber A contracts. Furthermore, the resistance provided by these first damping elements is caused by the orifice 22 in the case where the piston speed is in the low-speed range, and by the extension side and compression side hard leaf valves 20 and 21 in the case where the piston speed is in the medium- to high-speed range.

Next, a tubular gap C1 is formed between the cylinder 1 and the outer shell 10. The gap C1 continuously communicates with the extension side chamber L1 through a hole 1a formed in the bottom end of the cylinder 1. Furthermore, the gap C1 communicates with the damping force adjustment unit E through a hole 10a formed in the top end of the outer shell 10 and extension side aperture 11a formed in the end cap 11. Also, a compression side aperture 11b is formed in the end cap 11, and the compression side chamber L2 communicates with the damping force adjustment unit E through the compression side aperture 11b.

Figure 2:
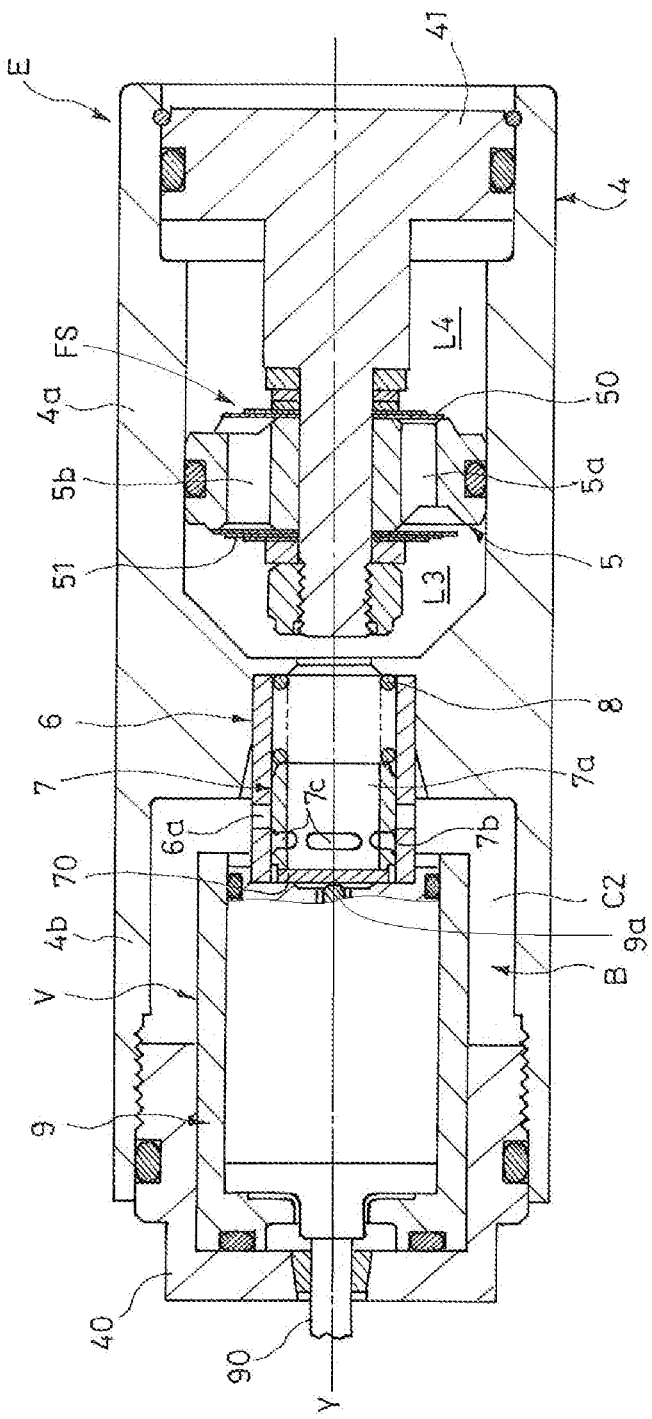
FIG. 2 is an enlarged partial longitudinal section illustrating an enlarged view of a damping force adjustment unit of a shock absorber according to an embodiment of the present invention.

As illustrated in FIG. 2, the damping force adjustment unit E is provided with a cylindrical housing 4, a cap 40 that closes one end of the housing 4, a bottom member 41 that closes the other end of the housing 4, a valve case 5 held by the bottom member 41 and secured inside the housing 4, and a solenoid valve V provided on the cap 40 side of the valve case 5 inside the housing 4.

Also, in the present embodiment, a central axis Y of the damping force adjustment unit E that passes through the center of the housing 4 is disposed along a line Z orthogonal to a central axis X of the shock absorber main body D that passes through the center of the piston rod 3 illustrated in FIG. 1. Hereinafter, for convenience, the left and right sides of the damping force adjustment unit E as illustrated in FIG. 2 are simply referred to as "left" and "right", but the mounting direction of the damping force adjustment unit E may be changed where appropriate. For example, the damping force adjustment unit E may be disposed such that the central axis Y extends in the width (left and right) direction or in the longitudinal direction of the vehicle.

Also, in the present embodiment, the housing 4 of the damping force adjustment unit E is integrated with the end cap 11 that closes the top end of the outer shell 10 and also with the vehicle body side bracket 12. Herein, the term integrated refers to forming and simultaneously uniting a plurality of members as a single unit rather than bonding or uniting a plurality of members formed separately.

Next, as illustrated in FIG. 2, the housing 4 includes a sub-cylinder part 4a that internally houses the valve case 5, and a case part 4b that houses the solenoid valve V. Additionally, the interior of the sub-cylinder part 4a is partitioned into a left side (cap 40 side) first chamber L3 and a right side (anti-cap side) second chamber L4 by the valve case 5. An extension side soft passage 5a and a compression side soft passage 5b that communicate with the first chamber L3 and the second chamber L4 are formed in the valve case 5, while in addition, a soft side damping element FS that imparts a resistance to the flow of liquid that passes through the extension side soft passage 5a and the compression side soft passage 5b to move between the first chamber L3 and the second chamber L4 is attached to the valve case 5.

Also, a gap C2 is formed between the case part 4b and the solenoid valve V, and the portion that connects the gap C2 and the first chamber L3 is opened and closed by the solenoid valve V. Furthermore, in the case part 4b, a through-hole (not illustrated) that opens into the gap C2 and also leads to the extension side aperture 11a is formed. As described above, the extension side aperture 11a communicates with the extension side chamber L1 through the gap C1 between the cylinder 1 and the outer shell 10.

On the other hand, on the right side of the sub-cylinder part 4a past the valve case 5, a through-hole (not illustrated) leading to the compression side aperture 11b (FIG. 1) is formed. As described above, the compression side aperture 11b communicates with the compression side chamber L2, and the second chamber L4 continuously communicates with the compression side chamber L2. Furthermore, the tank T is connected to the second chamber L4, and consequently the compression side chamber L2 continuously communicates with the tank T.

As illustrated in FIG. 1, the interior of the tank T is partitioned into a liquid chamber L5 and a gas chamber G by a free piston 18. A high-pressure gas is sealed inside the gas chamber G, the liquid chamber L5 is pressurized by the pressure of the gas chamber G, and the pressure is exerted inside the cylinder 1. Additionally, the pressure of the compression side chamber L2 is substantially the same as the pressure inside the tank T (tank pressure).

In other words, in the present embodiment, a bypass passage B that includes the tubular gap C1, the gap C2 in the case part 4b, the first chamber L3, and the second chamber L4, and which bypasses the hard side damping element FH to communicate with the extension side chamber L1 and the compression side chamber L2, is formed between the cylinder 1 and the outer shell 10 described above. Furthermore, the tank T is connected to the bypass passage B, and additionally, the solenoid valve V and the soft side damping element FS are provided in series in the bypass passage B closer to the extension side chamber L1 than the part that connects to the tank T. The soft side damping element FS is configured to include an extension side soft leaf valve 50 acting as a leaf valve that opens and closes the extension side soft passage 5a, a compression side soft leaf valve 51 acting as a leaf valve that opens and closes the compression side soft passage 5b, and an orifice 52 (FIG. 3).

Each of the extension side and compression side soft leaf valves 50 and 51 is a thin annular plate formed using a metal or the like, or a laminated body formed by stacking such annular plates, and is elastic. The extension side soft leaf valve 50 is mounted on the right side of the valve case 5 in a state allowing outward circumferential flexion, and the pressure of the first chamber L3 acts on the extension side soft leaf valve 50 in a direction causing the peripheral part to flex rightward. The compression side soft leaf valve 51 is stacked on the left side of the valve case 5 in a state allowing outward circumferential flexion, and the pressure of the second chamber L4 acts on the compression side soft leaf valve 51 in a direction causing the peripheral part to flex leftward.

The orifice 52 is formed by a notch provided in a peripheral part of the extension side and compression side soft leaf valves 50 and 51 that leave and land on a valve seat of the valve case 5, or by a stamp or the like provided in the seat. Consequently, the orifice 52 may be considered to be provided in parallel with the extension side and compression side soft leaf valves 50 and 51 in one or both of the extension side soft passage 5a and the compression side soft passage 5b.

When the shock absorber A extends and the solenoid valve V is open, the pressure of the first chamber L3 receives the pressure of the extension side chamber L1 and rises higher than the pressure of the second chamber L4. On the other hand, when the shock absorber A contracts and the solenoid valve V is open, the pressure of the second chamber L4 receives the pressure of the compression side chamber L2 (tank pressure) and rises higher than the pressure of the first chamber L3. In this way, a differential pressure occurs the first chamber L3 and the second chamber L4 when the shock absorber A extends or contracts and the solenoid valve V is open.

Additionally, in the case where the piston speed is in a low-speed range when the shock absorber A extends or contracts and the solenoid valve V is open, and the differential pressure does not satisfy the valve-opening pressure of the extension side and compression side soft leaf valves 50 and 51, liquid passes through the orifice 52 and proceeds from the first chamber L3 to the second chamber L4, in other words from the extension side chamber L1 to the compression side chamber L2, during extension, or from the second chamber L4 to the first chamber L3, or in other words from the compression side chamber L2 to the extension side chamber L1, during contraction, and a resistance is imparted to the flow of the liquid.

Also, in the case where the piston speed rises to the medium- to high-speed range when the shock absorber A extends and the solenoid valve V is open, and the differential pressure increases to meet or exceed the valve-opening pressure of the extension side soft leaf valve 50, the peripheral part of the extension side soft leaf valve 50 flexes and a gap is formed between the peripheral part and the valve case 5, liquid passes from the first chamber L3 to the second chamber L4 through the gap, or in other words proceeds from the extension side chamber L1 to the compression side chamber L2, and in addition, a resistance is imparted to the flow of liquid.

Also, in the case where the piston speed rises to the medium- to high-speed range when the shock absorber contracts and the solenoid valve V is open, and the differential pressure increases to meet or exceed the valve-opening pressure of the compression side soft leaf valve 51, the peripheral part of the compression side soft leaf valve 51 flexes and a gap is formed between the peripheral part and the valve case 5, liquid passes from the second chamber L4 to the first chamber L3 through the gap, or in other words proceeds from the compression side chamber L2 to the extension side chamber L1, and in addition, a resistance is imparted to the flow of liquid.

As the above demonstrates, the orifice 52 of the soft side damping element FS and the extension side soft leaf valve 50 function as an extension side second damping element that imparts a resistance to the flow of liquid proceeding from the extension side chamber L1 to the compression side chamber L2 through the bypass passage B when the shock absorber A extends. In addition, the orifice 52 of the soft side damping element FS and the compression side soft leaf valve 51 function as a compression side second damping element that imparts a resistance to the flow of liquid proceeding from the compression side chamber L2 to the extension side chamber L1 through the bypass passage B when the shock absorber A contracts. Furthermore, the resistance provided by these first and second damping elements is caused by the orifice 52 in the case where the piston speed is in the low-speed range, and by the extension side and compression side soft leaf valves 50 and 51 in the case where the piston speed is in the medium- to high-speed range.

Also, the extension side soft leaf valve 50 of the soft side damping element FS is a less rigid (more flexible) valve than the extension side hard leaf valve 20 of the hard side damping element FH, and in the case where the flow rate is the same, the resistance (pressure loss) imparted to the flow of liquid is smaller. Similarly, the compression side soft leaf valve 51 of the soft side damping element FS is a less rigid (more flexible) valve than the compression side hard leaf valve 21 of the hard side damping element FH, and in the case where the flow rate is the same, the resistance (pressure loss) imparted to the flow of liquid is smaller. In other words, under identical conditions, liquid passes through the soft leaf valves 50 and 51 more easily than the hard leaf valves 20 and 21. Furthermore, the orifice 52 of the soft side damping element FS is an orifice having a greater aperture area than the orifice 22 of the hard side damping element FH, and in the case where the flow rate is the same, the resistance (pressure loss) imparted to the flow of liquid is smaller.

Next, the solenoid valve V is configured to include a tubular holder 6 secured inside the housing 4, a spool 7 inserted into the holder 6 to allow reciprocating motion, a biasing spring 8 that biases the movement of the spool 7 in one direction, and a solenoid 9 that imparts thrust to the spool 7 in the direction opposing the biasing force of the biasing spring 8. Additionally, the magnitude of the opening degree of the solenoid valve V is adjusted by changing the position of the spool 7 inside the holder 6.

More specifically, the holder 6 is disposed along the central axis Y of the housing 4 with one end pointed to the left side (cap 40 side) in the axial direction and the other end pointed to the right side (valve case 5 side) inside the housing 4. Furthermore, one or more ports 6a penetrating the wall of the holder 6 in the radial direction are formed in the holder 6. The port(s) 6a communicate with the extension side chamber L1 through the gap C2, and are opened or closed by the spool 7.

The spool 7 is tubular, and is slidably inserted into the holder 6. A plate 70 is stacked on the left end of the spool 7, and a plunger 9a described later of the solenoid 9 abuts the plate 70. On the other hand, the biasing spring 8 abuts the right end of the spool 7, and the spool 7 is biased to the left side (solenoid 9 side) by the biasing spring 8.

In addition, a central hole 7a formed in a central part of the spool 7 communicates with the first chamber L3 through an opening in the right end of the spool 7. Furthermore, an annular groove 7b is formed in the circumferential direction on the perimeter of the spool 7, and in addition, one or more side holes 7c that communicate with the inner side of this annular groove 7b with the central hole 7a are formed. With this configuration, the inner side of the annular groove 7b communicates with the first chamber L3 through the side hole 7c and the central hole 7a.

According to the above configuration, in the case where the spool 7 is in a position where the annular groove 7b is opposite the port 6a of the holder 6, communication between the extension side chamber L1 and the first chamber L3 is allowed The state of the annular groove 7b and the port(s) 6a being opposite each other herein refers to a state in which the annular groove 7b and the port(s) 6a overlap each other in a radial view, and the aperture area of the bypass passage B changes depending on the amount of overlap.

For example, as the amount of overlap between the annular groove 7b and the port(s) 6a increases and the opening degree of the solenoid valve V increases, the aperture area of the bypass passage B increases. Conversely, as the amount of overlap between the annular groove 7b and the port(s) 6a decreases and the opening degree of the solenoid valve V decreases, the aperture area of the bypass passage B decreases. Furthermore, if the spool 7 moves to a position where the annular groove 7b and the port(s) 6a are completely non-overlapping and the solenoid valve V closes, communication with the bypass passage B is cut off.

Further, although a detailed illustration is omitted, the solenoid 9 of the solenoid valve V includes a tubular stator that includes a coil, a tubular movable iron core movably inserted into the stator, and the plunger 9a mounted on the inner perimeter of the movable iron core and having a leading end that abuts the plate 70. A harness 90 that supplies electric power to the solenoid 9 projects out from the cap 40 and is connected to a power source.

Additionally, when the solenoid 9 is energized through the harness 90, the movable iron core is drawn to the right side, the plunger 9a moves to the right, and the spool 7 moves to the right against the biasing force of the biasing spring 8. Subsequently, the annular groove 7b and the port(s) 6a face each other and the solenoid valve V opens. The relationship between the opening degree of the solenoid valve V and the energization level of the solenoid 9 is a proportional relationship having a positive constant of proportionality, such that the opening degree increases as the energization level rises. Furthermore, if electrical continuity to the solenoid 9 is cut, the solenoid valve V closes.

In this way, the solenoid valve V according to the present embodiment is a normally-closed type in which the spool 7 that acts as the valve element is biased in the closing direction by the biasing spring 8, and thrust in the opening direction is imparted to the spool 7 by the solenoid 9. Also, the opening degree of the solenoid valve V increases proportionally with the energization level, and the aperture area of the bypass passage B increases as the opening degree increases. Consequently, the aperture area of the bypass passage B may be considered to increase proportionally with the energization level of the solenoid valve V.

To summarize the above, as illustrated in FIG. 3, the shock absorber A according to the present embodiment is provided with the cylinder 1, the piston 2 slidably inserted into the cylinder 1 and dividing the interior of the cylinder 1 into the extension side chamber L1 and the compression side chamber L2, the piston rod 3 having a leading end joined to the piston 2 and a trailing end projecting out of the cylinder 1, and the tank T connected to the compression side chamber L2 in the cylinder 1, and the pressure of the compression side chamber L2 is the tank pressure. Furthermore, the shock absorber A is provided with the extension side passage 2a, the compression side passage 2b, and the bypass passage B as a passage that communicates with the extension side chamber L1 and the compression side chamber L2.

Additionally, the extension side passage 2a and the compression side passage 2b are provided with the extension side hard leaf valve 20 and the compression side hard leaf valve 21 that open and close each passage, respectively, and the orifice 22 is provided in parallel with the extension side and compression side hard leaf valves 20 and 21 in one or both of the extension side passage 2a and the compression side passage 2b. Additionally, the hard side damping element FH including the extension side hard leaf valve 20, the compression side hard leaf valve 21, and the orifice 22 and imparting a resistance to the flow of liquid is configured.

On the other hand, the tank T is connected to the bypass passage B, and additionally, the extension side chamber L1 side past the part that connects to the tank T in the bypass passage B branches into the extension side soft passage 5a and the compression side soft passage 5b. Additionally, the extension side soft passage 5a and the compression side soft passage 5b are provided with the extension side soft leaf valve 50 and the compression side soft leaf valve 51 that open and close each passage, respectively, and the orifice 52 is provided in parallel with the extension side and compression side soft leaf valves 50 and 51 in one or both of the extension side soft passage 5a and the compression side soft passage 5b.

The orifice 52 is a large-diameter orifice having a greater aperture area than the orifice 22. Also, the soft leaf valves 50 and 51 are less rigid than the hard leaf valves 20 and 21. In addition, the soft side damping element FS including the extension side soft leaf valve 50, the compression side soft leaf valve 51, and the orifice 52 and imparting a lowered resistance to the flow of liquid is configured.

Furthermore, the solenoid valve V is provided in series with the soft side damping element FS in the bypass passage B closer to the extension side chamber L1 than the part that connects to the tank T, and is configured such that the aperture area of the bypass passage B can be changed by adjusting the energization level of the solenoid valve V. Additionally, the solenoid valve V is a normally-closed type set to increase the aperture area of the bypass passage B proportionally with the energization level.

Hereinafter, the operation of the shock absorber A according to an embodiment of the present invention will be described.

When the shock absorber A extends, the piston rod 3 leaves the cylinder 1 and the piston 2 compresses the extension side chamber L1. Subsequently, liquid in the extension side chamber L1 moves to the compression side chamber L2 through the hard side damping element FH or the soft side damping element FS in the bypass passage B, and liquid equal to the volume of the piston rod 3 leaving the cylinder 1 is also supplied from the tank T to the compression side chamber L2. A resistance is imparted to the flow of liquid proceeding from the extension side chamber L1 to the compression side chamber L2 by the hard side damping element FH or the soft side damping element FS, and an extension side damping force due to the resistance is produced. Additionally, when the shock absorber A extends, the distribution ratio of the liquid passing through the hard side damping element FH and the soft side damping element FS changes according to the energization level of the solenoid valve V.

Specifically, when the shock absorber A extends, liquid passes through the extension side hard leaf valve 20 or the orifice 22 forming the extension side first damping element of the hard side damping element FH, or alternatively, through the extension side soft leaf valve 50 or the orifice 52 forming the extension side second damping element of the soft side damping element FS. In this way, the extension side first and second damping elements are configured to include the orifices 22 and 52 and the leaf valves provided in parallel therewith, namely the hard leaf valve 20 or the soft leaf valve 50. Consequently, in the case where the piston speed is in the low-speed range, the extension side damping force characteristics take on orifice characteristics proportional to the square of the piston speed and specific to orifices, whereas in the case where the piston speed is in the medium- to high-speed range, the extension side damping force characteristics take on valve characteristics proportional to the piston speed and specific to leaf valves.

Additionally, if the level of current supplied to the solenoid valve V is increased and the opening degree is increased, the flow in the bypass passage B increases and the proportion of liquid passing through the extension side damping element of the soft side damping element FS increases while the proportion of liquid passing through the extension side damping element of the hard side damping element FH decreases. The orifice 52 acting as the extension side damping element of the soft side damping element FS is a large-diameter orifice having a greater aperture area than the orifice 22 acting as the extension side damping element of the hard side damping element FH, and therefore if the proportion of liquid proceeding to the soft side damping element FS side increases, the damping coefficient increases in both the low-speed range and the medium- to high-speed range, and the extension side damping force produced in response to the piston speed decreases. Furthermore, when the amount of current supplied to the solenoid valve V reaches a maximum, the solenoid valve V is fully open. Moreover, the damping coefficient reaches a minimum, and the extension side damping force produced in response to the piston speed is minimized.

On the contrary, if the level of current supplied to the solenoid valve V is decreased and the opening degree is decreased, the flow in the bypass passage B decreases and the proportion of liquid passing through the extension side damping element of the soft side damping element FS decreases while the proportion of liquid passing through the extension side damping element of the hard side damping element FH increases. Moreover, the damping coefficient increases in both the low-speed range and the medium- to high-speed range, and the extension side damping force produced in response to the piston speed increases. Additionally, if electrical continuity to the solenoid valve V is cut, the solenoid valve V closes, and the entire flow passes through the extension side damping element of the hard side damping element FH. Moreover, the damping coefficient reaches a maximum, and the extension side damping force produced in response to the piston speed is maximized.

Figure 4:
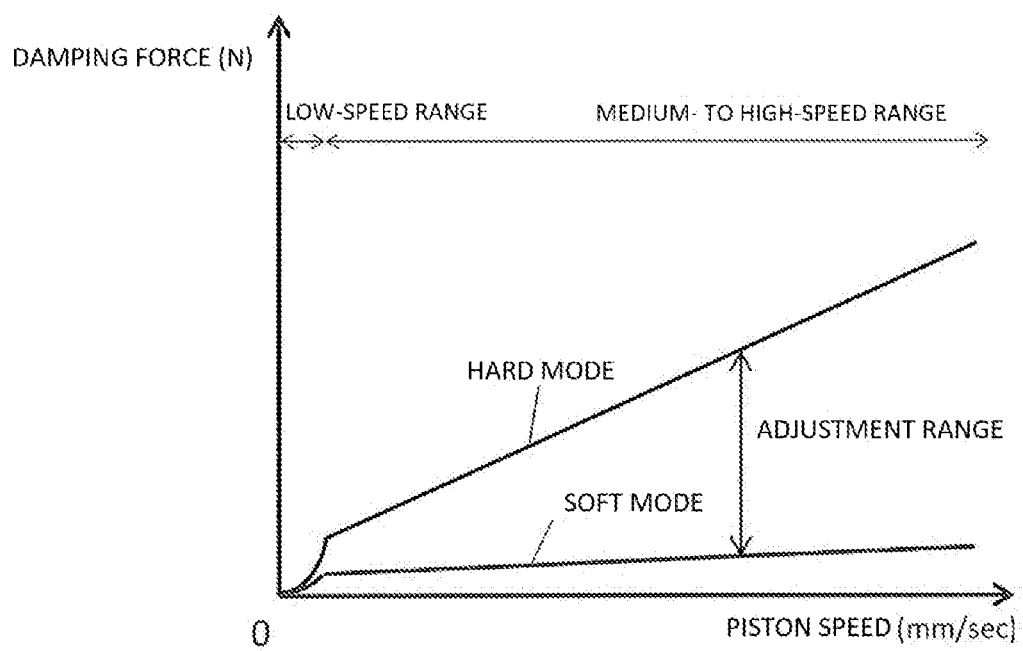
FIG. 4 is a damping force characteristic diagram illustrating the characteristics of the damping force with respect to the piston speed in a shock absorber according to an embodiment of the present invention.

In this way, by using the solenoid valve V to change the distribution ratio of liquid passing through the extension side first and second damping elements of the hard side damping element FH and the soft side damping element FS, the damping coefficient increases or decreases, and as illustrated in FIG. 4, the slope of the characteristic line indicating the extension side damping force characteristics changes. Furthermore, the extension side damping force is adjusted between the hard mode that maximizes the slope of the characteristic line to increase the produced damping force, and the soft mode that minimizes the slope to decrease the produced damping force.

Also, in the soft mode, the slope of the characteristic line indicating the damping force characteristics decreases in both the low-speed range and the medium- to high-speed range, while in the hard mode, the slope of the characteristic line indicating the damping force characteristics increases in both the low-speed range and the medium- to high-speed range. Consequently, the change when the damping force characteristics transition from the orifice characteristics to the valve characteristics is gradual in both modes.

Furthermore, the extension side damping element of the soft side damping element FS includes a less rigid leaf valve, namely the soft leaf valve 50, in parallel with the orifice 52. Consequently, even if highly rigid hard leaf valves having a high valve-opening pressure are adopted as the leaf valves forming the extension side damping element of the hard side damping element FH, and the adjustment range is widened in the direction of increasing extension side damping force, the damping force in soft mode does not become excessive.

On the contrary, when the shock absorber A contracts, the piston rod 3 enters the cylinder 1 and the piston 2 compresses the compression side chamber L2. Subsequently, liquid in the compression side chamber L2 moves to the extension side chamber L1 through the hard side damping element FH or the soft side damping element FS in the bypass passage B, and liquid equal to the volume of the piston rod 3 entering the cylinder 1 is also ejected from the compression side chamber L2 to the tank T. A resistance is imparted to the flow of liquid proceeding from the compression side chamber L2 to the extension side chamber L1 by the hard side damping element FH or the soft side damping element FS, and a compression side damping force due to the resistance is produced. Additionally, when the shock absorber A contracts, the distribution ratio of the liquid passing through the hard side damping element FH and the soft side damping element FS changes according to the energization level of the solenoid valve V.

Specifically, when the shock absorber A contract, liquid passes through the compression side hard leaf valve 21 or the orifice 22 forming the compression side first damping element of the hard side damping element FH, or alternatively, through the compression side soft leaf valve 51 or the orifice 52 forming the compression side second damping element of the soft side damping element FS. In this way, the compression side first and second damping elements are each configured to include the orifices 22 and 52 and the leaf valves provided in parallel therewith, namely the hard leaf valve 21 or the soft leaf valve 51. Consequently, in the case where the piston speed is in the low-speed range, the compression side damping force characteristics take on orifice characteristics proportional to the square of the piston speed and specific to orifices, whereas in the case where the piston speed is in the medium- to high-speed range, the compression side damping force characteristics take on valve characteristics proportional to the piston speed and specific to leaf valves.

Additionally, also when the shock absorber A contracts, if the distribution ratio of liquid passing through the compression side first and second damping elements of the hard side damping element FH and the soft side damping element changes, the damping coefficient increases or decreases, and the slope of the characteristic line indicating the compression side damping force characteristics changes similarly to the extension side damping force. Furthermore, when the shock absorber A contracts as well as when the shock absorber A extends, the compression side damping force is adjusted between the hard mode that maximizes the slope of the characteristic line to increase the produced damping force, and the soft mode that minimizes the slope to decrease the produced damping force.

Also, similar to the case when the shock absorber A extends, also when the shock absorber A contracts, the slope of the characteristic line indicating the damping force characteristics decreases in both the low-speed range and the medium- to high-speed range in the soft mode, while in the hard mode, the slope of the characteristic line indicating the damping force characteristics increases in both the low-speed range and the medium- to high-speed range. Therefore, the change when the damping force characteristics transition from the orifice characteristics to the valve characteristics is gradual in both modes. Furthermore, the compression side damping element of the soft side damping element FS also includes a less rigid leaf valve, namely the soft leaf valve 51, in parallel with the orifice 52. Consequently, even if highly rigid hard leaf valves having a high valve-opening pressure are adopted as the leaf valves forming the compression side damping element of the hard side damping element FH, the damping force in soft mode does not become excessive.

Hereinafter, the function and the effect of the shock absorber A according to an embodiment of the present invention will be described.

The shock absorber A according to the present embodiment is provided with the cylinder 1, the piston 2 inserted into the cylinder 1 in a state allowing movement in an axial direction and dividing the interior of the cylinder 1 into the extension side chamber L1 and the compression side chamber L2, the piston rod 3 joined to the piston 2 and having an end that projects out from the cylinder 1, and the tank T, connected to the compression side chamber L2, that pressurizes an interior of the cylinder 1.

Furthermore, the shock absorber A is provided with the hard side damping element FH that imparts a resistance to the flow of liquid moving between the extension side chamber L1 and the compression side chamber L2, the solenoid valve V configured to change the aperture area of the bypass passage B that bypasses the hard side damping element FH and communicates with the extension side chamber L1 and the compression side chamber L2, and the soft side damping element FS provided in series with the solenoid valve V in the bypass passage B. Furthermore, the hard side damping element FH is configured to include the orifice 22 as well as the extension side and compression side hard leaf valves 20 and 21 provided in parallel with the orifice 22. On the other hand, the soft side damping element FS is configured to include the orifice (large-diameter orifice) 52 having a larger aperture area than the orifice 22.

According to the above configuration, the interior of the cylinder 1 is pressurized by the tank T, and therefore a damping force with favorable response can be achieved. Furthermore, the characteristics of the damping force produced when the shock absorber A extends or contracts take on orifice characteristics specific to orifices in the case where the piston speed is in a low-speed range, and take on valve characteristics specific to leaf valves in the case where the piston speed is in a medium- to high-speed range. Additionally, if the aperture area of the bypass passage B is changed by the solenoid valve V, the distribution ratio of the flow of the liquid moving between the extension side chamber L1 and the compression side chamber L2 when the shock absorber A extends or contracts that passes through each of the hard side damping element FH and the soft side damping element FS changes, and therefore both the damping coefficient in the case where the piston speed is in a low-speed range and the damping coefficient in the case of the medium- to high-speed range can be set freely, and the adjustment range the damping force in the case where the piston speed is in the medium- to high-speed range can be widened.

Furthermore, in the soft mode that changes the aperture area of the bypass passage B to increase the distribution ratio of liquid proceeding to the soft side damping element FS, both the damping coefficient in the case where the piston speed is in the low-speed range and the damping coefficient in the case of the medium- to high-speed range decrease. On the other hand, in the hard mode that decreases the distribution ratio of liquid proceeding to the soft side damping element FS, the damping coefficient in the case where the piston speed is in the low-speed range and the damping coefficient in the case of the medium- to high-speed range increase. Consequently, when the characteristics of the damping force change from the orifice characteristics in the low-speed range to the valve characteristics in the mediumto high-speed range, the change in the slope of the characteristic line is gradual in both modes. With this configuration, in the case where the shock absorber A according to the present embodiment is installed in a vehicle, discomfort caused by changes in the above slope can be alleviated, and a favorable riding quality of the vehicle can be achieved.

Also, in the shock absorber A according to the present embodiment, the soft side damping element is configured to include the above orifice (large-diameter orifice) 52 as well as the extension side and compression side soft leaf valves 50 and 51 provided in parallel with the orifice 52. In this way, by also providing leaf valves in the soft side damping element FS, the damping force in soft mode does not become excessive, even if the hard leaf valves 20 and 21 of the hard side damping element FH are highly rigid valves having a high valve-opening pressure. In other words, according to the above configuration, highly rigid valves can be adopted as the hard leaf valves 20 and 21 of the hard side damping element. Furthermore, with such a configuration, the adjustment range of the damping force is widened in the direction of increasing damping force, and therefore the adjustment range of the damping force in the case where the piston speed is in the medium- to high-speed range can be widened further.

In addition, in the present embodiment, an extension side hard leaf valve 20 that imparts a resistance to the flow of the liquid proceeding from the extension side chamber L1 to the compression side chamber L2 and a compression side hard leaf valve 21 that imparts a resistance to the flow of the liquid proceeding from the compression side chamber L2 to the extension side chamber L1 are provided as the leaf valve of the hard side damping element FH. Further, an extension side soft leaf valve 50 that imparts a resistance to the flow of the liquid proceeding from the extension side chamber L1 to the compression side chamber L2 through the bypass passage B and a compression side soft leaf valve 51 that imparts a resistance to the flow of the liquid proceeding from the compression side chamber L2 to the extension side chamber L1 through the bypass passage B are provided as the leaf valve of the soft side damping element FS. With this arrangement, the adjustment range of the damping force is widened in the direction of increasing damping force when the shock absorber A both extends and contracts, and therefore the adjustment range of the damping force in the case where the piston speed is in the medium- to high-speed range can be widened further.

Nevertheless, in the shock absorber A according to the present embodiment, because the tank T is connected to the compression side chamber L2 and the pressure in the compression side chamber L2 does not exceed the tank pressure, the adjustment range of the compression side damping force is not as wide as the adjustment range of the extension side damping force. Accordingly, like the shock absorber A1 illustrated in FIG. 5, the compression side soft leaf valve 51 of the soft side damping element FS may be eliminated, and only the orifice 52 may be provided as the damping element on the compression side of the soft side damping element FS. In other words, only the extension side soft leaf valve 50 that imparts a resistance to the flow of liquid proceeding from the extension side chamber L1 to the compression side chamber L2 through the bypass passage B may be provided as the leaf valve of the soft side damping element FS.

Furthermore, the gas chamber G filled with high-pressure gas is formed inside the tank T according to the present embodiment, and the interior of the cylinder 1 is pressurized by the pressure of the gas chamber G. However, the configuration of the tank T may be changed where appropriate. For example, in the present embodiment, the gas chamber G and the liquid chamber L5 are partitioned by the free piston 18, but a component such as a bladder or bellows may also be used instead of the free piston 18. Also, a metal spring such as a coil spring that biases the free piston 18 toward the liquid chamber L5 side may be provided inside the tank T, and the biasing force may be used to pressurize the interior of the cylinder 1.

Also, in the present embodiment, the solenoid valve V is set such that the opening degree varies proportionally with the energization level. According to this configuration, the aperture area of the bypass passage B can be changed continuously.

Further, in the present embodiment, the solenoid valve V includes a tubular holder 6 in which port 6a that connects to the bypass passage B is formed, a spool 7 movably inserted into the holder 6 and configured to open and close the port 6a, a biasing spring 8 that biases the spool 7 in one movement direction of the spool 7, and a solenoid 9 that imparts thrust to the spool 7 in a direction opposing a biasing force of the biasing spring 8.

Here, like the solenoid valve described in JP 2010-7758 A, for example, in the case where a reciprocating needle valve is included as the valve element and the opening degree is changed by increasing or decreasing a gap formed between the tip of the needle valve and the valve seat, increasing the adjustment range of the opening degree necessitates increasing the stroke length of the valve element, but such a modification may not be possible in some cases.

Specifically, if the stroke length of the needle valve is increased, the movable space of the needle valve also increases, and securing housing space becomes more difficult. Also, if the stroke length of the plunger of the solenoid is increased to increase the stroke length of the needle valve, it is necessary to modify the solenoid design, which is complex. Furthermore, if one attempts to increase the stroke length of the needle valve without modifying the solenoid design, a part for increasing the movement amount of the needle valve with respect to the movement amount of the plunger is necessary, which increases the number of parts and also makes securing housing space more difficult.

In contrast, with the solenoid valve V according to the present embodiment, the port 6a formed in the holder 6 is opened and closed by the spool 7 inserted into the tubular holder 6 to allow reciprocating motion, thereby opening and closing the solenoid valve V. Consequently, if the port 6a is formed plurally in the circumferential direction of the holder 6 or formed having a long shape in the circumferential direction, the opening degree of the solenoid valve V can be increased without having to increase the stroke length of the spool 7 that acts as the valve element of the solenoid valve V. Accordingly, the adjustment range of the opening degree of the solenoid valve V is increased, and the adjustment range of the damping force can be increased easily.

Furthermore, according to the above configuration, the relationship between the opening degree and energization level of the solenoid valve V can be changed easily. For example, in the case of wanting to set the relationship between the opening degree and energization level of the solenoid valve V to an inversely proportional relationship having a negative constant of proportionality, such that the opening degree decreases as the energization level rises, it is sufficient to dispose the port(s) 6a or the annular groove 7b for opening the port(s) 6a at a position where the port(s) 6a are open to the maximum degree when the solenoid valve V is not energized.

In addition, an extension side port leading to the extension side soft passage and a compression side port leading to the compression side soft passage may be provided, and these ports may be opened and closed individually. In this way, the configuration of the solenoid valve V and the relationship between the opening degree and energization level of the solenoid valve V can be changed freely.

Figure 5:
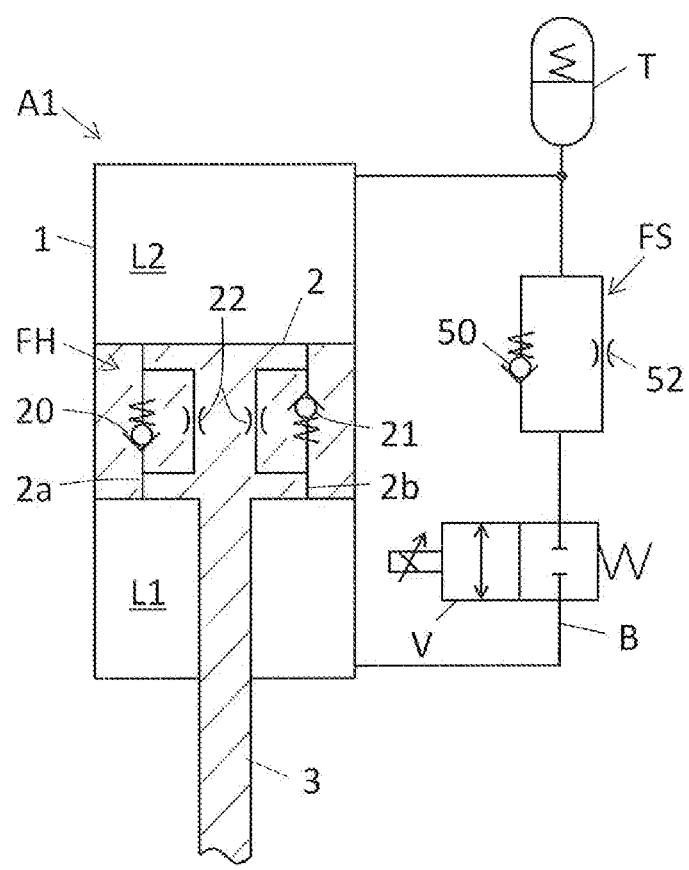
FIG. 5 is a hydraulic circuit diagram illustrating a modification of a shock absorber according to an embodiment of the present invention.
Figure 6:
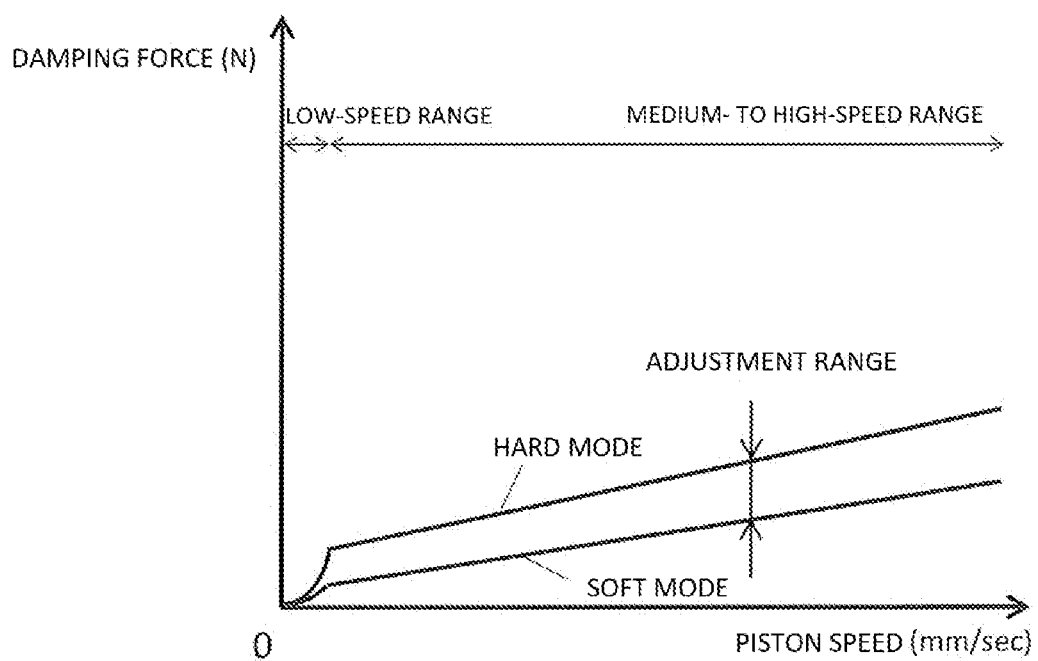
FIG. 6 is a damping force characteristic diagram illustrating the characteristics of the damping force with respect to the piston speed in a shock absorber provided with a needle valve of the related art.
Figure 7:
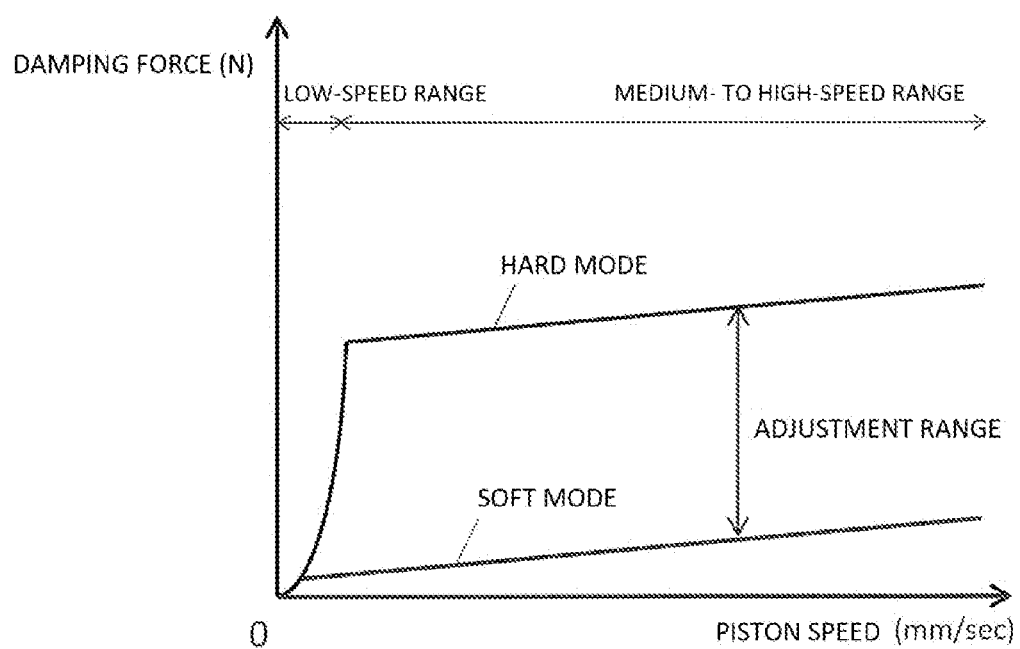
FIG. 7 is a damping force characteristic diagram illustrating the characteristics of the damping force with respect to the piston speed in a shock absorber provided with a pilot valve of the related art.

Further, the shock absorbers A and A1 illustrated in FIGS. 1 and 5 are configured such that a damping force is exhibited on both the extension and compression sides, and also such that the damping force on both the extension and compression sides is adjustable by the solenoid valve V. However, one of the extension side and compression side hard leaf valves 20 and 21 of the hard side damping element FH and one or both of the extension side and compression side soft leaf valves 50 and 51 of the soft side damping element FS may also be omitted, and the shock absorbers A and A1 may be configured as one-sided shock absorbers that exhibit damping force only when the shock absorbers A and A1 either extend or contract, or only the damping force of either the extension side or the compression side may be adjusted with the solenoid valve.

Also, in the present embodiment, the spool 7 moves along the central axis Y of the closed-bottom cylindrical housing 4. The central axis Y of the housing 4 is disposed along the line Z (FIG. 1) orthogonal to the central axis X passing through the center of the piston rod 3, and therefore the spool 7 may also be considered to move on the line Z.

According to the above configuration, the spool 7 moves in a direction orthogonal to the extension or contraction direction of the shock absorber A, and the movement direction is not aligned with the vibration direction of the vehicle. Consequently, the spool 7 is kept from oscillating in the movement direction due to vibrations while the vehicle is in motion. However, the movement direction of the spool 7 is not necessarily limited to the above. For example, the spool 7 may move obliquely with respect to the central axis X passing through the center of the piston rod 3, or the spool 7 may move along the central axis X.

Further, the shock absorber A according to the present embodiment includes the solenoid valve V, and a housing 4 containing the soft side damping element FS, and the housing 4 and the cylinder 1 are united. The united state of the cylinder 1 and the housing 4 herein refers to a state in which the housing 4 is secured and does not move freely with respect to the cylinder 1 when handling the shock absorber A alone, such that the cylinder 1 and the housing 4 can be treated like a single (united) member.

According to the above configuration, the interior of the housing 4 and the interior of the cylinder 1 can communicate using a hole formed in the portion that joins the housing 4 and the cylinder 1, such as the end cap 11. Consequently, the housing 4 and the cylinder 1 do not have to be connected by a hose, and an unintentional production of damping force due to the resistance when liquid passes through the hose can be prevented. Furthermore, it is possible to lower costs by omitting the hose.

However, the method of installing the damping force adjustment unit E including the housing 4 may be changed where appropriate. For example, the housing 4 and the cylinder 1 may also be connected by a hose. Also, in the present embodiment, the housing 4 and the tank T are connected by a hose, but the tank T and the housing 4 may also be united. Furthermore, in such a case, the housing 4, the end cap 11, the vehicle body side bracket 12, and the tank T may be integrated.

Although the preferred embodiment of the present invention has been described in detail above, modifications, variations, and alterations can be made without departing from the scope of the claims.

REFERENCE SIGNS LIST

A, A1 Shock absorber
B Bypass passage
L1 Extension side chamber
L2 Compression side chamber
FH Hard side damping element
FS Soft side damping element
T Tank
V Solenoid valve
X Central line
Z Line
1 Cylinder
2 Piston
3 Piston rod
4 Housing
6 Holder
6a Port
7 Spool
8 Biasing spring
9 Solenoid
20 Extension side hard leaf valve (leaf valve)
21 Compression side hard leaf valve (leaf valve)
22 Orifice
50 Extension side soft leaf valve (leaf valve)
51 Compression side soft leaf valve (leaf valve)
52 Orifice (large-diameter orifice)

The invention claimed is:

1. A shock absorber comprising:
a cylinder;
a piston inserted into the cylinder in a state allowing movement in an axial direction and demarcating an interior of the cylinder into an extension side chamber and a compression side chamber;
a piston rod having one end joined to the piston and another end that projects out from the cylinder;
a tank, connected to the compression side chamber, that pressurizes an interior of the cylinder;
a hard side damping element that imparts a resistance to a flow of a liquid moving between the extension side chamber and the compression side chamber;
a solenoid valve configured to change an aperture area of a bypass passage that bypasses the hard side damping element and communicates with the extension side chamber and the compression side chamber; and
a soft side damping element provided in series with the solenoid valve in the bypass passage, wherein
the hard side damping element includes an orifice and a leaf valve provided in parallel with the orifice, and
the soft side damping element includes a large-diameter orifice having a larger aperture area than the orifice of the hard side damping element.

2. The shock absorber according to claim 1, wherein
the soft side damping element includes a leaf valve provided in parallel with the large-diameter orifice.

3. The shock absorber according to claim 2, wherein
the leaf valve of the hard side damping element is an extension side hard leaf valve that imparts a resistance to the flow of the liquid proceeding from the extension side chamber to the compression side chamber and a compression side hard leaf valve that imparts a resistance to the flow of the liquid proceeding from the compression side chamber to the extension side chamber, and the leaf valve of the soft side damping element is an extension side soft leaf valve that imparts a resistance to the flow of the liquid proceeding from the extension side chamber to the compression side chamber through the bypass passage and a compression side soft leaf valve that imparts a resistance to the flow of the liquid proceeding from the compression side chamber to the extension side chamber through the bypass passage.

4. The shock absorber according to claim 2, wherein
the leaf valve of the hard side damping element is an extension side hard leaf valve that imparts a resistance to the flow of the liquid proceeding from the extension side chamber to the compression side chamber and a compression side hard leaf valve that imparts a resistance to the flow of the liquid proceeding from the compression side chamber to the extension side chamber, and the leaf valve of the soft side damping element consists only of an extension side soft leaf valve that imparts a resistance to the flow of the liquid proceeding from the extension side chamber to the compression side chamber through the bypass passage.

5. The shock absorber according to claim 1, wherein
the solenoid valve includes a tubular holder in which a port that connects to the bypass passage is formed, a spool inserted into the holder to allow reciprocating motion and configured to open and close the port, a biasing spring that biases the spool in one movement direction of the spool, and a solenoid that imparts thrust to the spool in a direction opposing a biasing force of the biasing spring.

6. The shock absorber according to claim 5, wherein
the spool moves along a line orthogonal to a central axis passing through a center of the piston rod.

7. The shock absorber according to claim 1, wherein
an opening degree of the solenoid valve varies proportionally with an energization level.

8. The shock absorber according to claim 1, further comprising:
a housing that internally houses the solenoid valve and the soft side damping element, wherein
the housing is united with the cylinder.

* * * * *